US007739681B2

(12) United States Patent
Sinha et al.

(10) Patent No.: US 7,739,681 B2
(45) Date of Patent: Jun. 15, 2010

(54) DELAYED APPLICATION INSTALLATION

(75) Inventors: Anand Sinha, Bangalore (IN); Yogita Jayandrath Naik, Maharashtra (IN)

(73) Assignee: Novell, Inc., Provo, UT (US)

( * ) Notice: Subject to any disclaimer, the term of this patent is extended or adjusted under 35 U.S.C. 154(b) by 959 days.

(21) Appl. No.: 11/235,026

(22) Filed: Sep. 26, 2005

(65) Prior Publication Data

US 2007/0006219 A1 Jan. 4, 2007

(30) Foreign Application Priority Data

Jun. 29, 2005 (IN) .................. 1683/DEL/2005

(51) Int. Cl.
G06F 9/44 (2006.01)
G06F 9/445 (2006.01)
G06F 9/00 (2006.01)
G06F 9/24 (2006.01)
G06F 15/177 (2006.01)

(52) U.S. Cl. .................. 717/173; 717/177; 709/221; 713/1

(58) Field of Classification Search ......... 717/168–178, 717/1–2; 709/220–222; 713/1–2
See application file for complete search history.

(56) References Cited

U.S. PATENT DOCUMENTS

| 5,721,824 | A | * | 2/1998 | Taylor ................... 717/175 |
| 5,764,992 | A | * | 6/1998 | Kullick et al. .......... 717/170 |
| 5,774,066 | A | | 6/1998 | Pellaton et al. |
| 6,006,034 | A | * | 12/1999 | Heath et al. ............. 717/170 |
| 6,353,928 | B1 | * | 3/2002 | Altberg et al. ........... 717/175 |
| 6,360,364 | B1 | * | 3/2002 | Chen et al. .............. 711/169 |
| 6,453,469 | B1 | * | 9/2002 | Jystad ..................... 717/174 |
| 6,502,124 | B1 | * | 12/2002 | Shimakawa et al. ..... 709/203 |
| 6,662,363 | B1 | * | 12/2003 | Miyamoto ............... 717/174 |
| 6,684,397 | B1 | | 1/2004 | Byer et al. |
| 6,698,018 | B1 | | 2/2004 | Zimniewicz et al. |
| 7,089,553 | B1 | * | 8/2006 | Glaser et al. ............ 717/178 |
| 7,155,462 | B1 | * | 12/2006 | Singh et al. ............. 717/170 |
| 7,237,122 | B2 | * | 6/2007 | Kadam et al. ........... 713/191 |
| 2001/0029607 | A1 | * | 10/2001 | Veres et al. ............... 717/11 |
| 2002/0144249 | A1 | | 10/2002 | Dull et al. |
| 2004/0187103 | A1 | * | 9/2004 | Wickham et al. ........ 717/168 |
| 2004/0210893 | A1 | * | 10/2004 | Chamberlain et al. ... 717/168 |
| 2005/0015761 | A1 | * | 1/2005 | Chang et al. ............ 717/174 |
| 2006/0026589 | A1 | * | 2/2006 | Schneider et al. ....... 717/174 |
| 2007/0022409 | A1 | * | 1/2007 | Levenshteyn ........... 717/136 |
| 2007/0214453 | A1 | * | 9/2007 | Dive-Reclus ............ 717/175 |

OTHER PUBLICATIONS

Silveira, G., "Spontaneous Software: A Web-based, Object Computing Paradigm", ICSE, 2000, 3pg.*

* cited by examiner

Primary Examiner—Wei Y Zhen
Assistant Examiner—Ryan D Coyer
(74) Attorney, Agent, or Firm—Schwegman, Lundberg & Woessner, P.A.

(57) ABSTRACT

Techniques for delaying the installation of an application are presented. An installation is downloaded to a portable device. The installation is associated with an application, which is to be loaded onto the portable device. The installation is delayed after download and is processed on the portable device when an alarm is raised indicating that the application is to be loaded on the portable device.

18 Claims, 3 Drawing Sheets

DELAYED APPLICATION INSTALLATION

RELATED APPLICATIONS

The present application claims priority to India Patent Application No. 1683/DEL/2005 filed in the India Patent Office on Jun. 29, 2005 and entitled "Delayed Application Installation;" the disclosure of which is incorporated by reference herein.

FIELD

The invention relates generally to data processing and more particularly to installation of applications.

BACKGROUND

Generally, applications are installed on devices before they become operational on those devices. Installation entails creating support files for the applications, making entries in device registries, creating executables or dynamic linked libraries for the applications within the devices, and the like. Once properly installed the applications perform their designed services or operations on the devices.

Typically, an application can be downloaded from a remote network location onto a target device, it can be uploaded from removable media that is interfaced to the target device, or it can be pre-fabricated within memory or storage of the target device. Installation of the application usually occurs once the application is downloaded or uploaded within the target device. Alternatively, the application is installed when a target device is initially booted up for a first time. Sometimes an application is downloaded and the installation occurs once a user manually initiates the installation. This can occur as soon as the application is downloaded or it can occur at a time the user decides to manually initiate the installation.

In an enterprise environment, network administrators may desire to coordinate when a particular application is released and installed on a plurality of enterprise devices. If these devices are portable and disconnected when administrators attempt to install the particular application, then the administrators may have to manually address or put patches in place to account for such a scenario, since the administrators will be unable to effectuate installations on devices not connected to the network.

In addition, an enterprise application is generally downloaded to the target devices as the installation takes place. This means that administrators tie up significant network bandwidth to perform a coordinated mass download to the target enterprise devices. Thus, the enterprise network may be degraded or unavailable to users during scheduled enterprise installations.

SUMMARY

In various embodiments, techniques for delayed application installation are presented. More particularly and in an embodiment, an installation for an application is downloaded over a network to a portable device. An installation condition is set on the portable device. The processing of the installation is delayed until the installation condition occurs. Once the installation condition is satisfied, the installation is processed and the application is loaded on the portable device.

DETAILED DESCRIPTION

An "application" includes software instructions that perform operations or services on devices. An application may also be viewed as a service or a system. An installation is a type of application that is designed to properly load and initiate another application on a target device. The installation knows how to create the support structures for a target application on a target device. A device is a machine that is capable of processing a loaded application. A device may be any machine that includes some degree of processing and has at least some memory or storage to support an application. A portable device is a device that need not be connected to a network and is easily movable or portable. Examples of portable devices include personal digital assistants (PDA's), laptop computers, tablet personal computers, phones, cameras, appliances with processing capabilities, intelligent apparel, etc.

Various embodiments of this invention can be implemented in existing network architectures and portable devices. Moreover, in some embodiments, portions of the techniques presented herein are implemented in whole or in part in the ZENworks®, distributed by Novell®, Inc., of Provo, Utah. In other cases, portions of the techniques presented herein are implemented in whole or in part in other Novell® network and proxy server products.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

Figure 1:
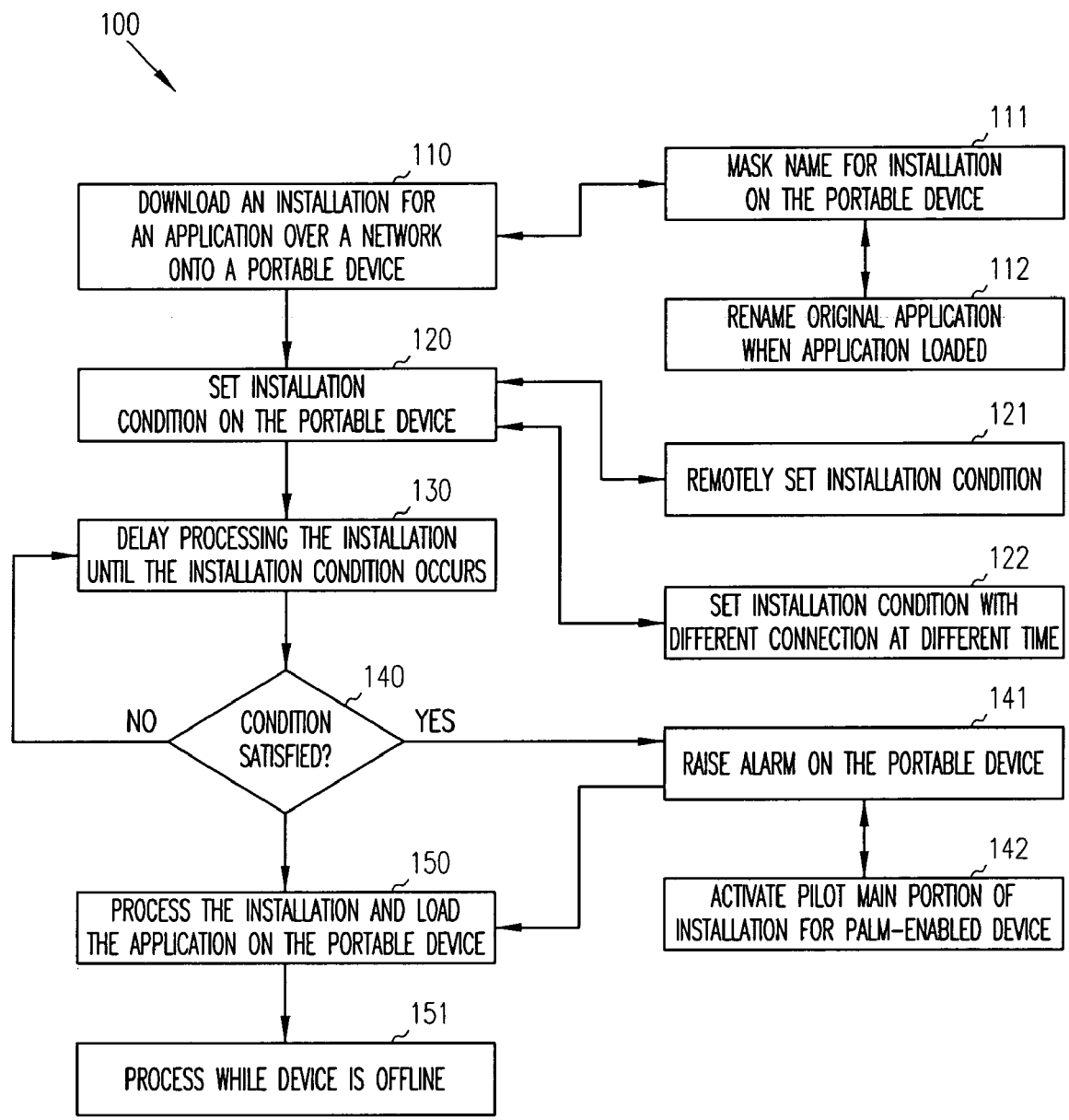
FIG. 1 is a diagram of a method for delayed application installation, according to an example embodiment.

FIG. 1 is a diagram of a method 100 for delayed application installation, according to an example embodiment. The method 100 (hereinafter "delayed application installation service") is implemented in a machine-access and machine-readable medium and is accessible over a network. In an embodiment, the delayed application installation service is implemented on a portable device as a service associated with ZENworks®, distributed by Novell®, Inc., of Provo, Utah.

At 110, the delayed application installation service downloads an installation for an application over a network. The network may be wireless, wired, or a combination of wired and wireless. The installation is downloaded to a portable device while that device is connected to the network. In some cases, the installation may represent a self-contained executable version of the application. That is, the installation may be an executable version of the application. In such a case, at 111, and in order to delay the availability of the application, the name associated with the application is masked or mangled; the application is then hidden within the portable device, such that is may not be known and used within the device.

Furthermore, if a different version of the application exists within the portable device, then, at 112, when the application is available for use the different version is renamed and the downloaded application is named as it should be assuming the name of the different version. The newer version of the application is hidden from view within the portable device. This permits two applications having the same executable name to coexist within the portable device where only one is executing at a given point in time and prevents the two from colliding with one another on the portable device. The downloaded application acquires the proper name and is visible on the device when it is appropriate for it to be installed on the portable device.

At 120, the delayed application installation service sets an installation condition on the portable device for installing the application. In an embodiment, the installation condition may be a calendar data and/or time. In another embodiment, the installation condition may be any configurable event that can be detected within the portable device. In yet another embodiment, at 121, the installation condition may be remotely set from a remote service. This may be the same remote service that supplies the installation for the application or it may be an entirely different remote service that exists over the network. In still another alternative embodiment, at 122, the installation condition may be set at a different time and via a different network connection from the time of the download and from the network connection originally associated with the download.

At 130, the processing of the installation is delayed until the installation condition occurs within the portable device. That is, the application that was downloaded to the portable device is not immediately available for execution on the portable device; rather, the application is installed and becomes fully operational when the installation condition is satisfied.

Accordingly, at 140, the installation condition is regularly or periodically inspected to determine if it has been satisfied such that the application may be properly installed on the portable device. In an embodiment, the installation condition is defined as an alarm within a device and the condition is detected when satisfied by an alarm service within the portable device, the delayed application installation service determines that the installation condition is satisfied when it receives the alarm. For example, on PALM®-enabled devices an alarm service exists, such that at specified calendar dates and/or times an alarm is raised. Here, at 141, the delayed application installation service receives the raised alarm and decides the installation condition is satisfied. The alarm may be designed to activate, at 142, a pilot-main section or portion of the installation on the PALM®-enabled device. In some cases, a single alarm may be defined at a time within the portable device. In these situations, the delayed application installation service may determine when its alarm, if time-sensitive can be defined within the portable device and when it can be installed, the alarm is set. As long as the installation condition is not satisfied, the processing of the delayed application installation service continues to delay the installation of the application.

Once the installation condition is satisfied, at 140, the delayed application installation service, at 150, processes the installation to load the application within or on the portable device. As was mentioned above, this may entail renaming or deleting any existing and executing version of the application to something different and renaming a previous masked or mangled name of the installation to the original name of the original executing version, and making the new installation visible on the device.

In an embodiment, at 151, the processing of the installation may occur while or when the portable device is offline and not connected to the network. Thus, an application may be deployed via an installation to a portable device and an installation condition set for installing the application by completing or processing the installation and the installation can occur when the condition is met even if the condition is met when the portable device is offline. In essence, an application can be pushed to the portable device during a prior connection and its installation delayed until a desired condition is met. The user may be unaware of the push. This allows a network administrator to piecemeal deploy an application to a variety of enterprise devices and to define a condition, such as a date and time that the installation should complete. All enterprise devices synchronize independent of one another via the common condition and yet they are capable of installing the application in unison and without any further administrator interaction. This can alleviate administration associated with deploying applications and at the same time permit more control and management for the actual switch over to the deployed application on a plurality of enterprise devices.

Figure 2:
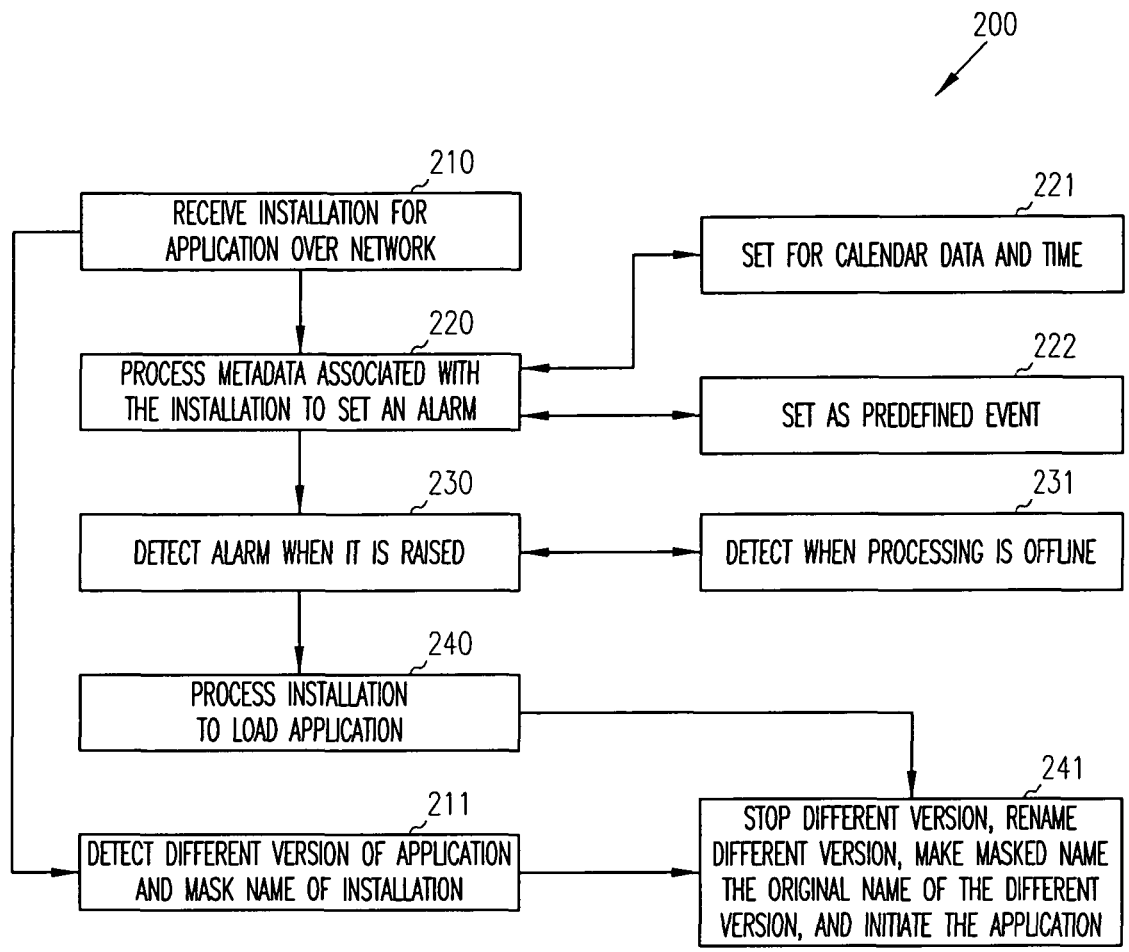
FIG. 2 is a diagram of another method for delayed application installation, according to an example embodiment.

FIG. 2 is a diagram of another method 200 for delayed application installation, according to an example embodiment. The method 200 (hereinafter "deployment application service") is implemented in a machine-accessible and readable medium over a network. The network may be wired, wireless, or a combination of wired and wireless. The processing of the deployment application service represents an alternative perspective to the method 100 of FIG. 1.

At 210, the deployment application service receives over a network an installation for an application. The installation includes metadata, such as an installation alarm condition. At 220, the deployment application service inspects or processes the metadata associated with the installation to set an alarm.

In an embodiment, at 221, the alarm may be set as a calendar date and time, such that the installation is completed or processed on a given and predefined calendar data and time. In an alternative embodiment, at 222, the metadata may define the alarm as a predefined event, such as detecting when a user tries to access a feature of a different version of an application that is known to have been subsequently enhanced; when this event is detected the alarm is raised to force a replacement of the application with the downloaded application. A variety of other configured events may be used to define the alarm within the metadata. All such conditions used to delay and define an alarm within metadata associated with an installation are intended to fall within the generous scope of the embodiments presented herein.

At 230, the deployment application service detects when the alarm is raised. Again, in some cases, at 231, this detection may actually occur when the deployment application service and the device on which it is processing is offline and not connected to the network.

At 240, the deployment application service processes the installation once the alarm is raised. Thus, in response to the alarm, the deployment application service completes a load of the prior downloaded application and initiates the application on the device associated with the deployment application service. At this point the prior downloaded application is available for use.

In an embodiment, at 211, a different version of the application being installed may co-exist on the device of the deployment application service and may be executing. In such a situation, the prior downloaded installation may be hidden and have its name masked within the device, such that it is not available for use while the different version executes. This name change avoids collisions within the environment of the device that processes the deployment application service. When the alarm is raised, at 241, the deployment application service stops the original and different version of the application, renames it and makes the masked name of the prior downloaded application have the name of the original and different version of the application. It also un-hides or makes visible the downloaded application. Essentially, two different versions of an application may coexist within the same processing environment and one is operational over the other based on the detected alarm. That is, the original version executes with the appropriate executable name until the alarm is detected. Once the alarm is detected, the prior-downloaded application assumes the appropriate executable name and the version executing is stopped and renamed. This avoids collisions and provides control over when each version of the application is current within the device of the deployment application service.

In some embodiments, the deployment application service is implemented as a feature within ZENworks®, distributed by Novell®, Inc., of Provo, Utah and on a PALM®-enabled device. The device permits a single alarm for any given application at a time. The deployment application service within ZENworks® receives the downloaded installation and manages when it is appropriate for an alarm to be active within the device, since the device may only permit a single defined alarm at any given moment. When the alarm is available to be defined within the device, it is defined. In the interim, the downloaded installation for the application coexists under a mangled name with mangled names for any supporting structures used by the application. The downloaded application remains in a hidden format or form on the device. Once the alarm is raised by the device, the deployment application service renames structures and initiates the application within the device for execution.

Figure 3:
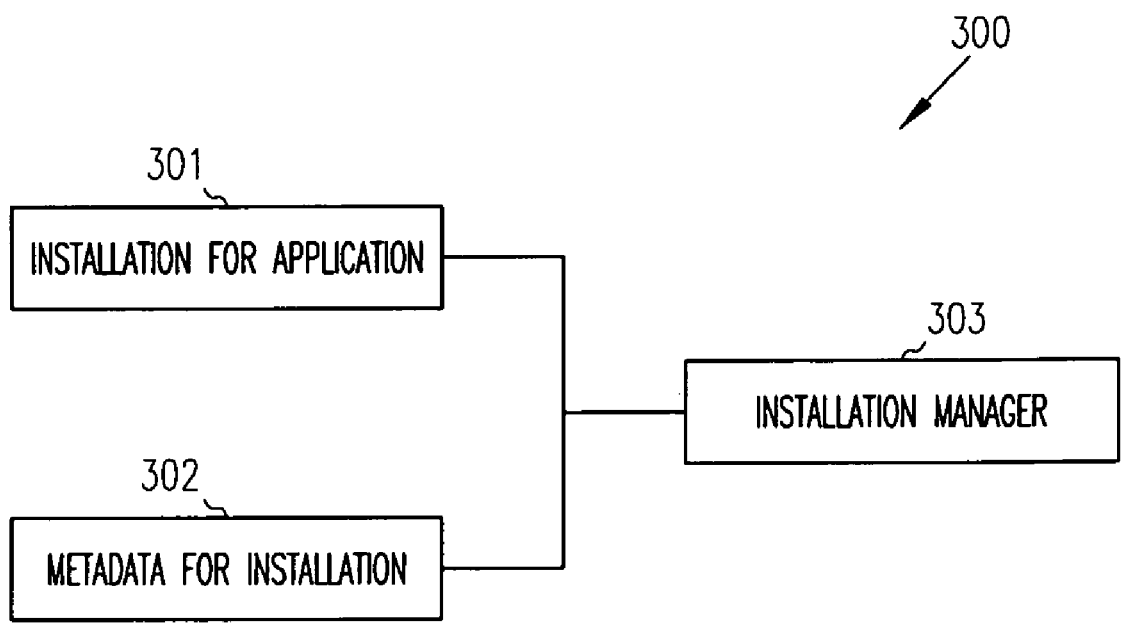
FIG. 3 is a diagram of a delayed application installation system, according to an example embodiment.

FIG. 3 is a diagram of a delayed application installation system 300, according to an example embodiment. The delayed application installation system 300 is implemented in a machine-accessible and readable medium and is accessible over a network. The network may be wired, wireless, or a combination of wired and wireless. In an embodiment, the delayed application installation system 300 implements, among other things, the methods 100 and 200 of FIGS. 1 and 2, respectively.

In an embodiment, the delayed application installation system 300 is implemented on a portable device as a service that delays installation of a prior or previously downloaded application. The installation is delayed until a predefined and configurable installation condition is met. The portable device may be a digital phone, a tablet personal computer, a laptop computer, a PDA, an intelligent appliance, intelligent apparel, etc.

The delayed application installation system 300 includes an installation for an application 301, metadata for the installation 302, and an installation manager 303. Each of these will now be discussed in turn.

The installation for the application 301 includes instructions for installing the application. In some cases, the installation for the application 301 is the application, meaning that the application does not have any special processing necessary to make it operational within the device that includes the delayed application installation system 300.

The metadata 302 includes the installation condition, which may include information useful in setting an alarm within the device that executes and includes the delayed application installation system 300. The metadata 302 may also include other information, such as versioning information, creator information, keys, signatures, etc.

The installation manager 303 is a service or application that inspects and processes the metadata 302 and the installation for the application 301 for purposes of making the installation within the device of the delayed application installation system 300 and setting the alarm. The alarm is defined within the metadata 302. In an embodiment, the installation manager 303 is implemented as a feature or service associated with ZENworks®, distributed by Novell®, Inc. of Provo, Utah.

The installation manager 303 receives the installation for the application 301 over a network connection from a remote service. The metadata 302 may be received by the same remote service during the same network connection or the metadata 302 may be received by a different remote service and/or during a different network connection from when the installation manager 303 receives the installation for the application 301.

The installation manager 303 may mangle the name associated with the installation for the application 301 within the environment of the device that executes and houses the delayed application installation system 300. The installation manger 303 also parses the metadata 302 to determine the alarm and may interface with an alarm service within the device to determine when it is acceptable to set the alarm. The condition that defines the alarm is included within the metadata 302.

When the alarm is raised within the device, the installation manager 303 restores an original name associated with the installation for the application 301 and essentially processes the installation for the application 301 to load the application within the device. In some cases, if a prior version of the application is executing on the device, that prior version is halted, renamed, and hidden so that the newer version of the application can process on the device without a name clash or collision.

Figure 4:
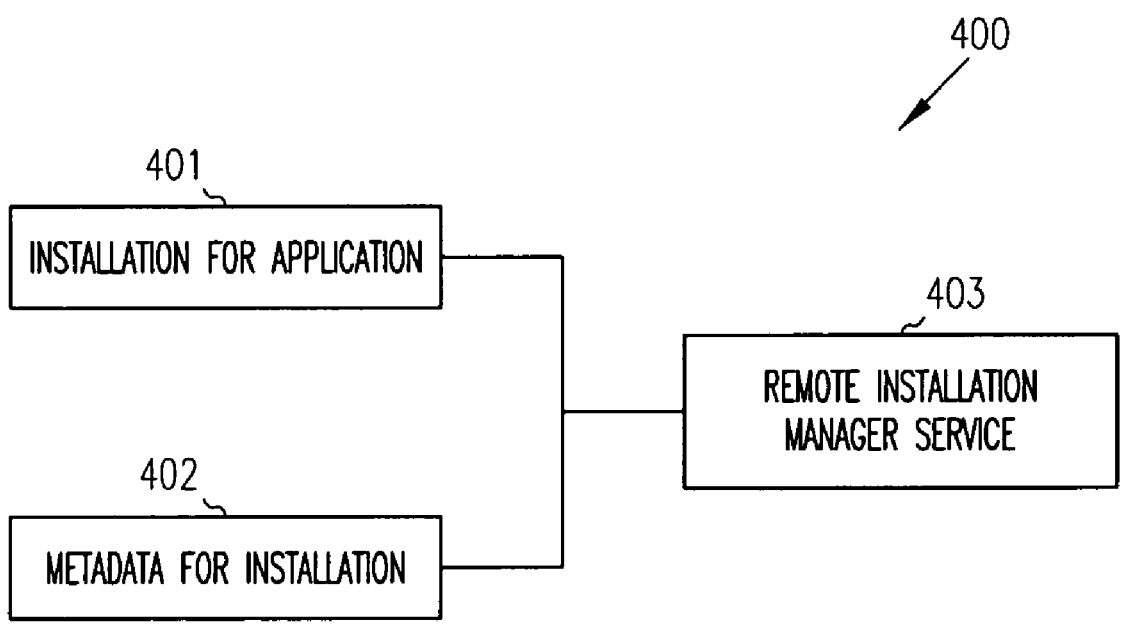
FIG. 4 is a diagram of another delayed application installation system, according to an example embodiment.

FIG. 4 is a diagram of another delayed application installation system 400, according to an example embodiment. The delayed application installation system 400 is implemented in a machine-accessible and readable medium and is accessible over a network. The network may be wired, wireless, or a combination of wired and wireless. The delayed application installation system 400 differs from the delayed application installation system 300 of FIG. 3 in that the delayed application installation system 400 represents processing taking by a remote service that delivers an application and supporting conditions to a device for delayed installment of the application on that device.

The delayed application installation system 400 includes an installation for an application 401, metadata for the installation 402, and a remote installation manager service 403. Each of these will now be discussed in turn.

The installation for an application 401 was defined above with respect to the delayed application installation system 300 of FIG. 3. The installation for the application 401 is created or defined and made accessible on a device associated with the remote installation manager service 403.

The metadata 402 was defined above with respect to the delayed application installation system 300 of FIG. 3. The metadata 402 may be defined via extensible markup language (XML) statement or via any structure format. Interfaces may permit the metadata 402 to be semi-automatically created. In other cases, the metadata 402 may be derived or acquired from an automated service.

The remote installation manager service 402 bundles the installation for the application 401 and the metadata 402 that defines the delayed installation condition, such as an alarm, and delivers or deploys the package on a remote and portable device, such as the portable devices described above. The portable device then processes this information or package to decide when the installation condition is met and thus when it is appropriate to install, initiate, and load the application, which had previously been deployed over the network by the remote installation manager service 402.

One now fully appreciates how deployment of an application can be separated efficiently from the installation of the application by defining installation conditions for portable device that subsequently load the application. This provides a decoupling and streamlining of the deployment and installation process for an application and yet still permits installation synchronization, since each device receiving an installation independently processes the installation condition and loads the application. Moreover, each installation can be customized, such that one device may have a different installation condition than that which is associated with another device. Thus, control over installation is improved with the techniques presented herein for delayed application installation.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium and to process on a portable device to perform the method, comprising:
   downloading an installation for an application over a network to the portable device, the installation is pushed to the portable device and a user of the portable device is unaware of the installation being pushed to the portable device;
   setting an installation condition on the portable device, wherein the installation is downloaded over the network from a remote service and an entirely different remote service from the remote service network sets the installation condition, the different remote service sets the installation condition via a different network connection to the portable device from an original network connection used for downloading the installation, the portable device having the installation when the different remote service sets the installation condition via the different network connection to the portable device;
   delaying the processing of the installation until the installation condition occurs, wherein the installation condition is an alarm that is raised when a user of a different version of the application tries to access a feature of that different version that has been enhanced in the installation, the different version of the application co-exists with the installation and is executing on the device when the user tries to access the enhanced feature associated with the installation; and
   processing, upon satisfaction of the installation condition, the installation which loads the application on the portable device, forces a replacement of the different version of the application and, subsequently, forces the removal of the different version of the application.

2. The method of claim 1 further comprising, raising an alarm on the portable device when the installation condition is satisfied.

3. The method of claim 2, wherein raising further includes activating a pilot main portion of the installation when the alarm is raised, and wherein the portable device is a PALM-enabled device.

4. The method of claim 1, wherein downloading further includes masking a name for the installation on the portable device and hiding the installation within the portable device.

5. The method of claim 1, wherein processing further includes renaming an original application associated with a different version of the application when the application is loaded on the portable device.

6. The method of claim 1, wherein processing further includes processing the installation upon satisfaction of the installation condition, which is when the portable device is offline from the network.

7. The method of claim 1, wherein setting further includes remotely setting the installation condition on the portable device over the network when the installation is downloaded over the network.

8. A method implemented in a non-transitory computer-readable storage medium and to process on a portable device to perform the method, comprising:
   receiving an installation for a new version of an application over a network and masking the name of the new version of the application upon receipt;
   processing metadata associated with the installation to set an alarm, the metadata received separately from the installation;
   detecting the alarm when it is raised, the alarm is raised when a user of a different version of the application tries to access an enabled feature of that different version that has been enhanced in the new version of the application, the different version of the application co-exists with the new version of the application and is executing on the device when the user tries to access the enhanced feature associated with the new version of the application; and
   processing the installation to terminate execution of the different version of the application, to unmask the name of the new version of the application, to replace the different version of the application with new version of the application, and to execute the application and remove the different version of the application from the portable device.

9. The method of claim 8 further comprising:
   detecting the different version of the application; and
   masking a name associated with the installation.

10. The method of claim 9 further comprising:
    stopping processing associated with the different version of the application when the application is loaded;
    renaming the different version in storage; and
    changing the name to a name originally associated with the different version and starting the application.

11. The method of claim 8, wherein detecting further includes detecting the raised alarm when the method is processing offline from the network.

12. A system implemented in a non-transitory computer-readable storage medium and to process on a portable device, comprising:
    an installation for an application implemented as instructions that process on the portable device, the installation is pushed and previously downloaded from a remote service over a network to the portable device;

metadata associated with the installation and processed on the portable device, the metadata is pushed from a different remote service to the portable device during a different network connection from that which was used to acquire the installation, the portable device having the installation when the metadata is pushed to the portable device using the different network connection; and an installation manager that processes on the portable device to set an alarm defined in the metadata and to process the installation when the alarm is raised to load the application, wherein the alarm defined in metadata is raised when a user of a different version of the application tries to access a feature of that different version that has been enhanced in the installation, the different version of the application co-exists with the installation and is executing on the device when the user tries to access the enhanced feature associated with the installation, and wherein processing the installation comprises loading the application, forcing a replacement of the different version of the application and, subsequently, forcing the removal of the different version of the application.

13. The system of claim 12, wherein the installation is acquired over a network.

14. The system of claim 13, wherein the network is at least one of wireless, wired, and a combination of wired and wireless.

15. The system of claim 12, wherein the portable device is at least one of a phone, a tablet personal computer, a personal digital assistant, and a laptop computer.

16. A system implemented in a non-transitory computer-readable storage medium and to process on a portable device, comprising:

an installation for a new version of an application implemented as instructions that process on the portable device;

metadata received by the portable device separately from the installation and associated with the installation and processed on the portable device; and a remote installation service that processes on a device to deliver the installation and the metadata over a network to the portable device via a push and the installation and the metadata delivery is unknown to a user of the portable device, masking the name of the new version of the application upon receipt, the metadata defines for the portable device when the installation is to be processed on the portable device to load the new version of the application, and an alarm defined via the metadata is raised indicating the portable device is to unmask the name of the new version and load the new version of the application when the user attempts to access a feature of a different version of the application that has been enhanced by the new version of the application, and the different version of the application is removed from the portable device when the new version of the application is loaded, the different version of the application co-exists with the new version of the application on the portable device and the different version of the application is executing on the portable device until the user attempts to access the enhanced feature that triggers the alarm and forces stoppage and removal of the different version of the application from the portable device.

17. The system of claim 16, wherein the metadata defines a condition associated with at least one of predefined calendar date and a predefined event, which when detected on the portable device causes the portable device to process the installation.

18. The system of claim 16, wherein the remote installation service delivers the installation in a compressed format over the network.

* * * * *